US009639451B2

(12) United States Patent
Tudor et al.

(10) Patent No.: US 9,639,451 B2
(45) Date of Patent: May 2, 2017

(54) DEBUGGER SYSTEM, METHOD AND COMPUTER PROGRAM PRODUCT FOR UTILIZING HARDWARE BREAKPOINTS FOR DEBUGGING INSTRUCTIONS

(75) Inventors: Constantin Tudor, Bucharest (RO); Sorin Babeanu, Drobeta Turnu Severin (RO)

(73) Assignee: NXP USA, INC., Austin, TX (US)

( * ) Notice: Subject to any disclaimer, the term of this patent is extended or adjusted under 35 U.S.C. 154(b) by 916 days.

(21) Appl. No.: 13/522,382

(22) PCT Filed: Jan. 25, 2010

(86) PCT No.: PCT/IB2010/050312
§ 371 (c)(1),
(2), (4) Date: Jul. 16, 2012

(87) PCT Pub. No.: WO2011/089478
PCT Pub. Date: Jul. 28, 2011

(65) Prior Publication Data
US 2012/0297173 A1    Nov. 22, 2012

(51) Int. Cl.
*G06F 9/30* (2006.01)
*G06F 11/36* (2006.01)

(52) U.S. Cl.
CPC ...... *G06F 11/3648* (2013.01); *G06F 9/30145* (2013.01); *G06F 11/3636* (2013.01); *G06F 11/3664* (2013.01)

(58) Field of Classification Search
CPC .......................... G06F 11/3636; G06F 11/3664
(Continued)

(56) References Cited

U.S. PATENT DOCUMENTS 5,050,168 A * 9/1991 Paterson ........................ 714/35
5,621,886 A * 4/1997 Alpert et al. .............. 714/38.13
(Continued)

OTHER PUBLICATIONS

International Search Report and Written Opinion correlating to PCT/IB2010/050312 dated Oct. 25, 2010.

*Primary Examiner* — Andrew Caldwell
*Assistant Examiner* — Michael Metzger (57) ABSTRACT

Debugger system, method and computer program product for debugging instructions. The method for debugging instructions may include: receiving, by a debugger module, a group of instructions that are stored in a non-volatile memory module and is scheduled to be executed by a processor of a device; determining whether the group of instructions includes a conditional branch instruction; defining, by the debugger module, a hardware breakpoint address as an address of the conditional branch instruction if the group of instructions includes the conditional branch instruction; defining, by the debugger module, the hardware breakpoint as an address of a last instruction of the group of instructions to be executed if the group of instructions does not comprise the conditional branch instruction; instructing a hardware breakpoint detector of the device to detect the hardware breakpoint address; instructing the processor to execute instructions of the group of instructions in a continuous mode until the hardware breakpoint detector detects the hardware breakpoint address; instructing the processor to execute at least one instruction of the group of instructions in a single step mode after the hardware breakpoint detector detects the hardware breakpoint address; and receiving, from the device, debug information that is indicative of an execution of instructions by the processor.

20 Claims, 4 Drawing Sheets

(58) Field of Classification Search
 USPC .......................................................... 712/227
 See application file for complete search history.

(56) References Cited

U.S. PATENT DOCUMENTS

| | | | |
|---|---|---|---|
| 5,630,049 A * | 5/1997 | Cardoza et al. ................ 714/25 |
| 5,659,679 A * | 8/1997 | Alpert et al. ................... 714/34 |
| 5,740,413 A * | 4/1998 | Alpert et al. ................. 712/227 |
| 6,052,774 A | 4/2000 | Segars et al. |
| 6,182,208 B1 * | 1/2001 | Peri et al. ..................... 712/227 |
| 6,798,713 B1 | 9/2004 | Yearsley et al. |
| 7,574,585 B1 * | 8/2009 | Nekl ................... G06F 11/3656 |
| | | 712/227 |
| 2005/0060690 A1 * | 3/2005 | Tung et al. ................... 717/129 |
| 2007/0022322 A1 | 1/2007 | Chen et al. |
| 2008/0040587 A1 | 2/2008 | Burke et al. |
| 2008/0270988 A1 * | 10/2008 | Li et al. ........................ 717/125 |
| 2010/0049956 A1 * | 2/2010 | Moyer .................. G06F 9/3005 |
| | | 712/227 |
| 2011/0126175 A1 * | 5/2011 | Suizu ........................... 717/129 |

\* cited by examiner

DEBUGGER SYSTEM, METHOD AND COMPUTER PROGRAM PRODUCT FOR UTILIZING HARDWARE BREAKPOINTS FOR DEBUGGING INSTRUCTIONS

FIELD OF THE INVENTION

This invention relates to a debugger system, a method and a computer program product for debugging instructions.

BACKGROUND OF THE INVENTION

Processors execute programs that include multiple instructions. These instructions may be stored in volatile memory modules or in non-volatile memory modules. When these instructions are stored in a volatile memory module software breakpoints can be easily inserted to the program. When the instructions are stored in a non-volatile memory module it is very hard to insert software breakpoints into the program.

One common method of debugging instructions that are stored in a non-volatile memory module is known as stepping and involves executing one instruction at a time and stopping the execution process after the execution of each instruction in order to obtain debug information and process it. Stepping is time consuming and dramatically slows the debugging process.

SUMMARY OF THE INVENTION

The present invention provides a debugger system, a method and a computer program product for debugging instructions as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Figure 1:
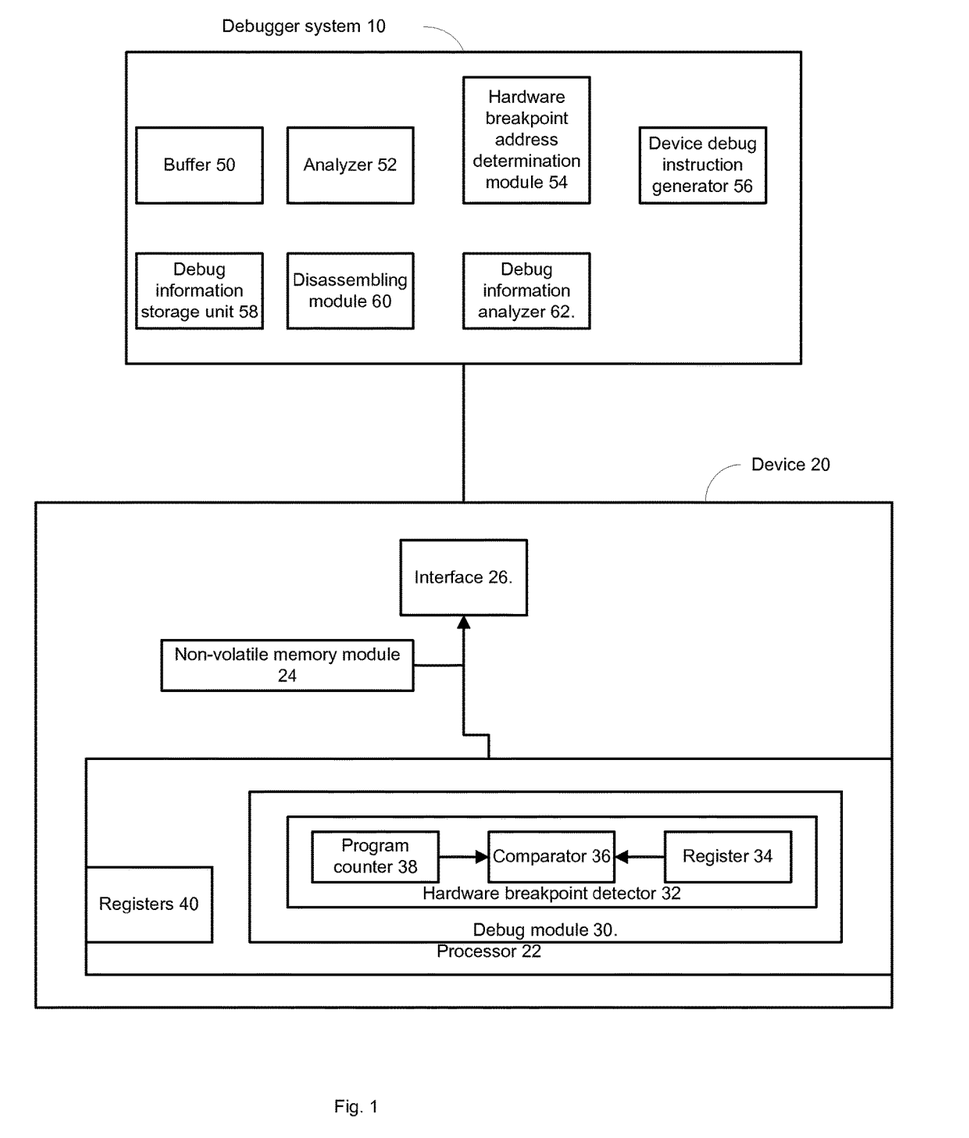
FIG. 1 schematically shows an example of an embodiment of a debugger system and of a device 20.

FIG. 1 schematically shows an example of an embodiment of debugger system 10 and of a device 20.

The device 20 includes a processor 22, a non-volatile memory module 24 and an interface 26. The processor 22 executes instructions that are fetched from the non-volatile memory module 24. Due to the complexity associated with re-programming non-volatile memory units the instructions may not include software breakpoints.

The interface 26 is used to output debug information from the device 20 to the debugger system 10 and to receive instructions from the debugger system 10. The interface 26 can be a JTAG compliant interface but this is not necessarily so.

The processor 22 includes a debug module 30. The debug module 30 includes a hardware breakpoint detector 32 that detects a hardware breakpoint address. The hardware breakpoint address is sent from the debugger system 10 and is stored in a register 34 of the hardware breakpoint detector 32. A comparator 36 of the hardware breakpoint detector 32 compares addresses of instructions that are executed by the processor 22 (as reflected by a value of a program counter 38 of the processor 22) to the hardware breakpoint address.

If an address of an instruction that is executed by the processor 22 equals the hardware breakpoint address then the comparator 36 sends a match signal that causes the debug module 30 to instruct the processor 22 to start operate in a single step mode—execute an instruction and wait for a trigger from the debug module 30 to execute the next instruction. When executing instructions at the single step mode the content of various registers 40 of the processor 22 can be sent to the debugger system 10.

Debugger system 10 includes a buffer 50, an analyzer 52, a hardware breakpoint address determination module 54, a device debug instruction generator 56, a debug information storage unit 58, a disassembling module 60 and a debug information analyzer 62.

The buffer 50 receives a group of instructions that are stored in the non-volatile memory module 24 and are scheduled to be executed by the processor 22. The group of instructions can be sent via the interface 26.

The analyzer 52 analyzes the group of instructions and determines whether the group of instructions includes a conditional branch instruction.

The hardware breakpoint address determination module 54 can define a hardware breakpoint address as an address of the conditional branch instruction if the group of instructions includes a conditional branch instruction. If there are more than a single conditional branch instruction in the group of instructions then the hardware breakpoint address determination module 54 defines the first conditional branch instruction as the hardware breakpoint address.

The hardware breakpoint address determination module 54 can define the hardware breakpoint address as an address of a last instruction of the group of instructions to be executed if the group of instructions does not include the conditional branch instruction.

The hardware breakpoint address is sent via interface 26 to the hardware breakpoint detector 32.

The device debug instruction generator 56 generates instructions that are sent to the debug module 30. The debug instruction generator 56 can instruct the hardware breakpoint detector 32 to detect the hardware breakpoint address, can instruct the processor 22 to execute instructions of the group of instructions in a continuous mode until the hardware breakpoint detector 32 detects the hardware breakpoint address, and can instruct the processor 22 to execute at least one instruction of the group of instructions in a single step mode after the hardware breakpoint detector detects 32 the hardware breakpoint address.

The debug information storage unit 58 receives debug information indicative of an execution of instructions by the processor 22.

The disassembling module 60 disassembles the group of instructions and provides a disassembled version of the group of instructions to the analyzer 52.

The debug information analyzer 62 is arranged to analyze the debug information to determine whether to continue to execute instructions of the group of instructions. The analysis can include comparing a current program counter value to an allowed range of program counter values and determining whether to stop the debugging process if the program counter value is outside the allowed range.

The debug information can include a sequence of program counter values and the debug information analyzer 62 can determine whether to continue an execution of instructions of the group of instructions based on the change of the program counter values. The debug information analyzer 62 can also determine if a conditional branch instruction resulted in a branch (if the condition of the conditional branch has been fulfilled)—based on a change of program counter values as a result of an execution of the conditional branch instruction.

Figure 2:
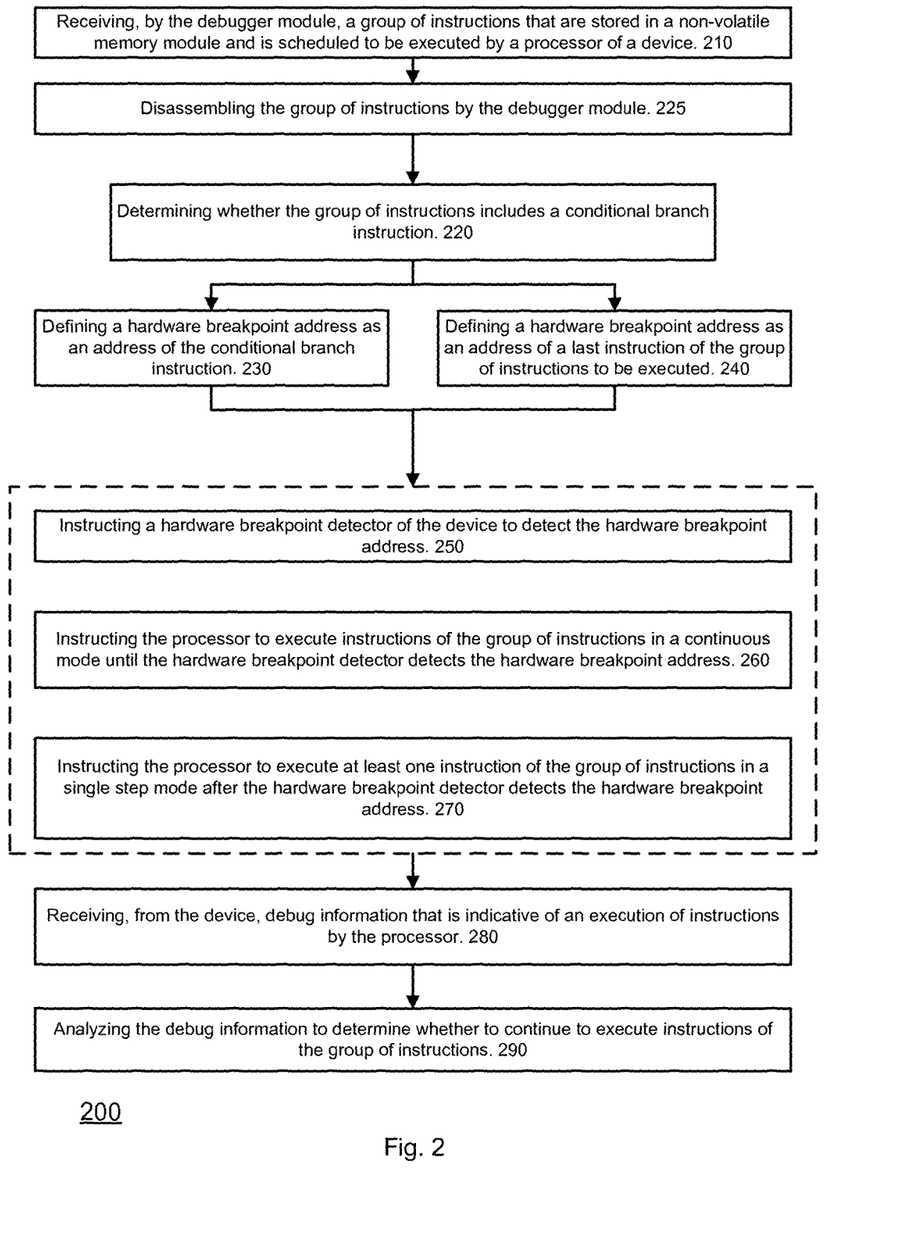
FIG. 2 schematically shows an example of an embodiment of a method for debugging instructions.

FIG. 2 schematically shows an example of an embodiment of a method 200 for debugging instructions.

Method 200 can be executed by the debugger system 10 of FIG. 1 and especially by the debugger module 22 of the debugger system 10.

Method 200 starts by stage 210 of receiving, by the debugger module, a group of instructions that are stored in a non-volatile memory module and is scheduled to be executed by a processor of a device.

Stage 210 is followed by stage 220 of determining whether the group of instructions includes a conditional branch instruction.

If the answer is positive (the group of instructions includes a conditional branch instruction) then stage 220 is followed by stage 230 of defining a hardware breakpoint address as an address of the conditional branch instruction.

If the answer is negative (the group of instructions does not include a conditional branch instruction) then stage 220 is followed by stage 240 of defining a hardware breakpoint address as an address of a last instruction of the group of instructions to be executed.

Stage 230 and 240 are followed by stages 250, 260 and 270.

Stage 250 includes instructing a hardware breakpoint detector of the device to detect the hardware breakpoint address.

Stage 260 includes instructing the processor to execute instructions of the group of instructions in a continuous mode until the hardware breakpoint detector detects the hardware breakpoint address.

Stage 270 includes instructing the processor to execute at least one instruction of the group of instructions in a single step mode after the hardware breakpoint detector detects the hardware breakpoint address.

Stage 250, 260 and 270 are followed by stage 280 of receiving, from the device, debug information that is indicative of an execution of instructions by the processor.

Method 200 can include stage 225 of disassembling the group of instructions by the debugger module. Stage 225 can follow stage 210 and precede stage 220.

Stage 280 can be followed by stage 290 of analyzing the debug information to determine whether to continue to execute instructions of the group of instructions.

Stage 280 can include receiving debug information that is indicative of a change of program counter values as a result of an execution of the conditional branch instruction. Stage 290 can include determining whether to continue an execution of instructions of the group of instructions based on the change of the program counter values.

Stage 280 can include receiving debug information that is indicative of a change of program counter values as a result of an execution of the conditional branch instruction. Stage 290 can include determining whether the processor branched based on the change of the program counter values.

Figure 3:
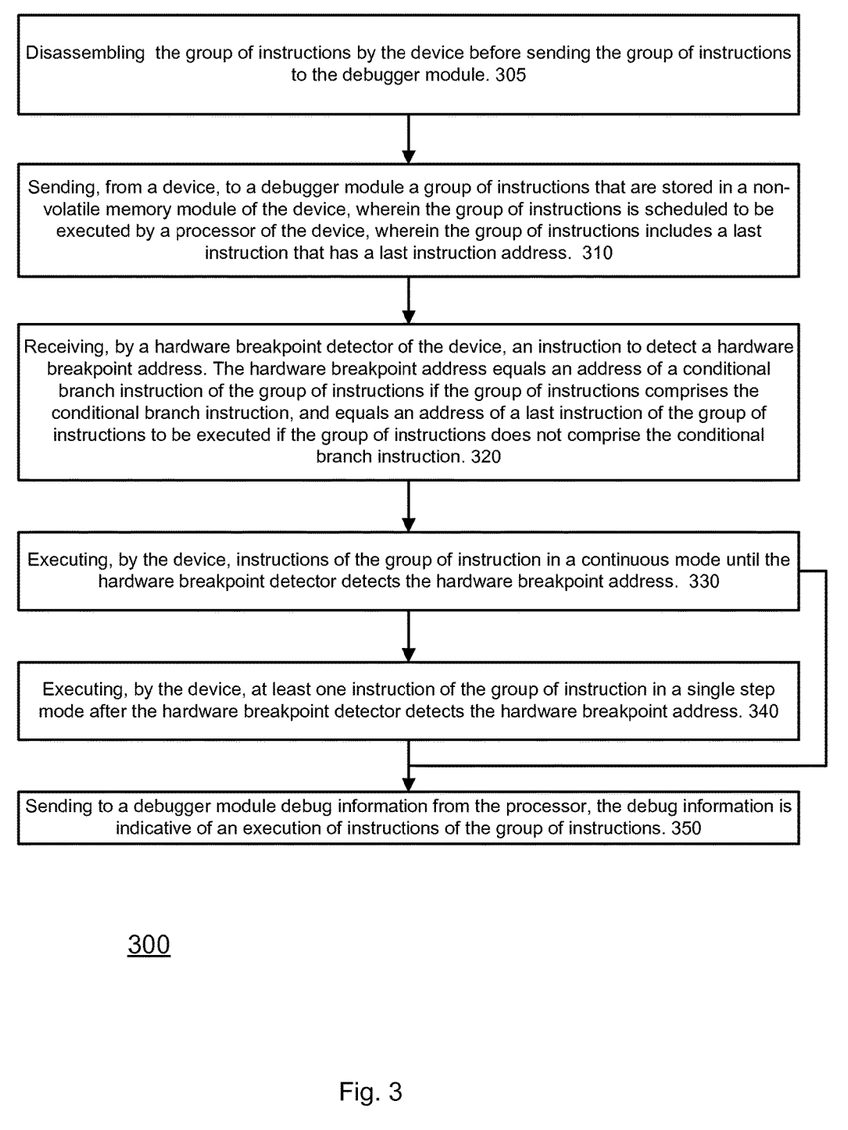
FIG. 3 schematically shows an example of an embodiment of a method for executing instructions.

FIG. 3 schematically shows an example of an embodiment of a method 300 for executing instructions.

Stage 300 starts by stage 310 of sending, from a device, to a debugger module a group of instructions that are stored in a non-volatile memory module of the device, wherein the group of instructions is scheduled to be executed by a processor of the device, wherein the group of instructions includes a last instruction that has a last instruction address.

Stage 310 can be preceded by stage 305 of disassembling the group of instructions by the device before sending the group of instructions to the debugger module.

Stage 310 is followed by stage 320 of receiving, by a hardware breakpoint detector of the device, an instruction to detect a hardware breakpoint address. The hardware breakpoint address equals an address of a conditional branch instruction of the group of instructions if the group of instructions includes the conditional branch instruction, and equals an address of a last instruction of the group of instructions to be executed if the group of instructions does not include the conditional branch instruction.

Stage 320 is followed by stage 330 of executing, by the device, instructions of the group of instructions in a continuous mode until the hardware breakpoint detector detects the hardware breakpoint address.

Stage 330 is followed by stage 340 of executing, by the device, at least one instruction of the group of instructions in a single step mode after the hardware breakpoint detector detects the hardware breakpoint address.

Either one of stages 330 and 340 can be followed by stage 350 of sending to a debugger module debug information from the processor, the debug information is indicative of an execution of instructions of the group of instructions.

The continuous mode is much faster than the single step mode as there is no need to stop after the execution of each instruction and send debug mode.

Figure 4:
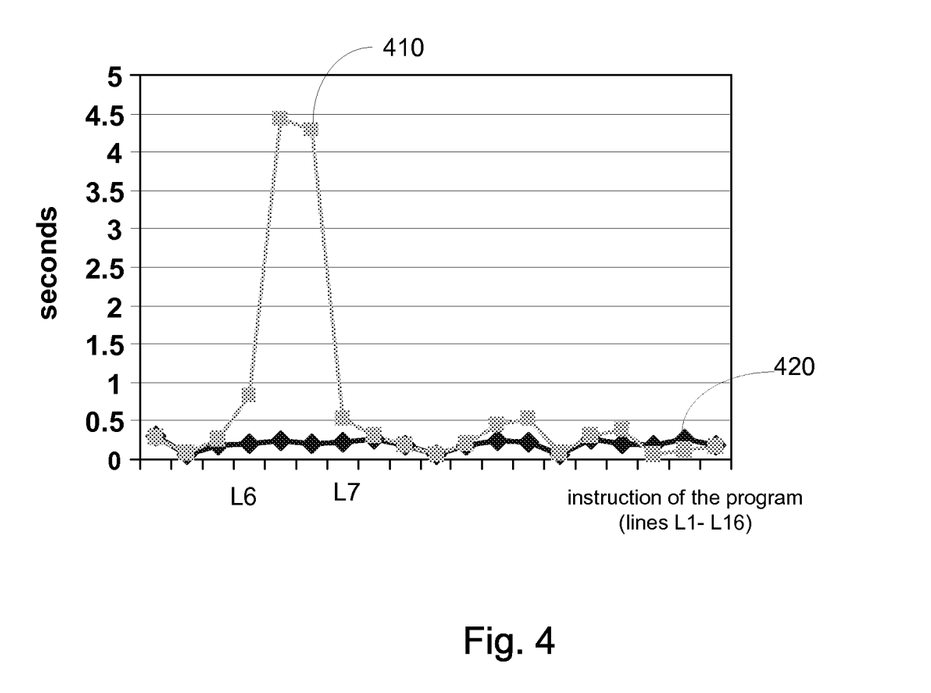
FIG. 4 illustrates a time of execution of a code only at a single step mode in comparison to a time of execution of the same code by the method of FIG. 2.

FIG. 4 illustrates a time of execution of a program only at a single step mode in comparison to a time of execution of the same program by method 200.

The code includes sixteen lines L1-L16 and calls to three functions termed func_1, func_2 and func_3.

```
Program
L1      void dbg_stress_stepping(void)
L2      {
L3      unsigned int nA = 0u,nB = 0u,nC = 0u,nD = 0u,nE = 0u;
L4      /* ...... */
L5      nD = func_1(1u) + func_2(1u);
L6      nB = func_2(10u) + func_2(11u) + func_2(12u) +func_2(13u) +
        func_2(14u) + func_2(15u);
L7      nA = func_1(10u) + func_1(11u) + func_1(12u) +func_1(13u) +
        func_1(14u) + func_1(15u);
L8      nE += func_3(10u);
L9      if ( nA <= nB )  {(void)func_1(16u);}
L10     else   {(void)func_1(17u);}
L11     if ( nA <= nB )  {nC += func_1(16u);}
L12     else   {nC *= func_1(16u);}
L13     if ( nC >= nA )  {nA += func_1(16u);}
L14     else   {nB += func_2(16u);}
L15     /* ....... */
L16     }
Func_1
        unsigned int func_1( unsigned int n )
        {unsigned int nRet= 0u, i= 0u;
        for( ; i < n; i++ )
        {_RESET_WATCHDOG( );
        nRet += i;}
        return nRet;}
Func_2
        unsigned int func_2( unsigned int n )
        {unsigned int nRet= 1u, i= 1u;
        for( ; i < n; i++ )
        {RESET_WATCHDOG( );
        nRet *= i;}
        return nRet;}
Func_3
        unsigned int func_3( unsigned int n )
        {return ++n;}
```

Curve 410 illustrates the time of execution of different instructions of a code when operating only at a single step mode. This single step mode is suitable when the group of instructions that include the code is not analyzed to detect conditional branch instructions. The detection of conditional branches and the evaluation of a fulfillment of the condition are suitable in order to determine which line of the program should be executed and debugged—following a conditional branch instruction. In order not to miss conditional branch instructions the program is executed at a single step mode and after each instruction the program counter should be evaluated in order to determine if a branch occurred. Each of the functions func_1, func_2 and func_3 includes multiple iterations and the execution of these functions at a single step mode is time consuming.

Curve 420 illustrates the time of execution of different instructions of the program when applying a combination of continuous mode and single step mode. Because the program does not include any conditional branches the hardware breakpoint address is set to the address of the last instruction of the program—the address of line L16. The device executes the program in a continuous mode and is much faster.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, a processor and a non-volatile memory unit can reside on the same integrated circuit. Alternatively, the examples may be implemented as any number of separate integrated circuits or separate devices interconnected with each other in a suitable manner. For example, the processor and the non-volatile memory unit can be included in different integrated circuits Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for debugging instructions, the method comprising:
   determining, by a debugger module, an end address of a group of instructions that are stored in a non-volatile memory module and are scheduled to be executed by a processor of a device;
   reading the group of instructions into the debugger module from the non-volatile memory module through a hardware debug interface;
   determining, by the debugger module, a number of conditional branch instructions included in the group of instructions;
   in response to the number of conditional branch instructions being non-zero, writing, by the debugger module, an address of a first conditional branch instruction of the group of instructions into a hardware compare register of the processor;
   in response to the number of conditional branch instructions being zero writing, by the debugger module, the end address into the hardware compare register;
   instructing the processor through the hardware debug interface to execute instructions of the group of instructions;
   comparing, in the processor, an address of an instruction to be executed with the address stored in the hardware compare register;
   in response to the address of the instruction being equal to the address stored in the hardware compare register, halting execution of the group of instructions;
   in response to halting execution of the group of instructions, instructing the processor to execute one instruction of the group of instructions and providing an indication from the processor to the debugger module indicating a change in instruction address.

2. The method according to claim 1, comprising disassembling the group of instructions by the debugger module before the determining, by the debugger module, the number of conditional branch instructions.

3. The method according to claim 1, further comprising in response to providing the indication,
   determining whether to continue executing instructions of the group of instructions.

4. The method according to claim 1, further comprising:
   providing a second indication that the change in instruction address was a result of an execution of the first conditional branch instruction; and
   determining whether to continue an execution of instructions of the group of instructions based on the change of instruction address.

5. The method according to claim 1, further comprising:
   determining whether the processor branched based on the change of instruction address.

6. The method according to claim 1 further comprising determining, by the debugger module, that the group of instructions comprises a second conditional branch instruction.

7. A method for executing instructions, the method comprising:
   sending, from a device, to a debugger module a group of instructions that are stored in a non-volatile memory module of the device, wherein the group of instructions is scheduled to be executed by a processor of the device, wherein the group of instructions comprises a last instruction that has a last instruction address;
   determining by the debugger module a number of conditional branch instructions included in the group of instructions;
   receiving, by a hardware breakpoint detector of the device, an instruction to detect a hardware breakpoint address; wherein the hardware breakpoint address equals an address of a conditional branch instruction if the number of conditional branch instructions is non-zero and wherein the hardware breakpoint address equals an address of the last instruction address if the number of conditional branch instructions is zero;
   executing, by the processor, instructions of the group of instruction in a continuous;
   comparing an address of an instruction to be execute with the hardware breakpoint address;
   in response to the address of the instruction being equal to hardware breakpoint address, halting execution;
   in response to halting execution, executing, by the processor, at one instruction of the group of instruction in a single step mode; and providing an indication from the processor to the debugger module indicating whether a conditional branch instruction caused a change in instruction address.

8. The method according to claim 7, further comprising disassembling the group of instructions by the device before sending the group of instructions to the debugger module.

9. A computer program product that comprises a non-transitory computer readable medium usable with a programmable debugging host, the computer readable medium storing instructions for:
   determining by a debugging host, an end address of a group of instructions that are stored in a non-volatile memory module and scheduled to be executed by a processor of a device;
   reading the group of instructions into the debugger module from the non-volatile memory module through a hardware debug interface;
   determining, by the debugging host, a number of conditional branch instructions included in the group of instructions;
   in response to the number of conditional branch instructions being non-zero writing, by the debugging host, an address of a first conditional branch instruction into a hardware compare register of the processor;
   in response to the number of conditional branch instructions being zero writing, by the debugging host, the end address into the hardware compare register;
   instructing the processor through the hardware debug interface to execute instructions of the group of instructions in a continuous mode;
   comparing, in the processor, an address of an instruction to be executed with the address stored in the hardware compare register;
   in response to the address of the instruction being equal to the address stored in the hardware compare register, halting execution of the group of instructions;
   in response to halting execution of the group of instructions, instructing the processor to execute one instruction of the group of instructions in a single step mode; and
   providing an indication from the processor to the debugger module indicating a change in instruction address.

10. The computer program product of claim 9, wherein the instructions further comprise instructions for disassembling the group of instructions by the debugging host before the determining a number of conditional branch instructions.

11. The computer program product of claim 9, wherein the instructions further comprise instructions for determining whether to continue to execute instructions of the group of instructions based on the change in instruction address.

12. The computer program product of claim 9, wherein the instructions further comprise instructions for:
   providing a second indication that the change in instruction address was a result of an execution of the first conditional branch instruction; and
   determining whether to continue an execution of instructions of the group of instructions based on the change of instruction address.

13. The computer program product of claim 9, wherein the instructions further comprise instructions for:
   determining whether the processor branched based on the change of the instruction address.

14. The computer program product of claim 9, wherein the instructions further comprise instructions for determining, that the group of instructions comprises a second conditional branch instruction.

15. The method according to claim 2, wherein providing an indication from the processor is followed by determining, based on the indication, whether to continue executing instructions of the group of instructions.

16. The method according to claim 2, further comprising:
   providing an indication that the change in instruction address was a result of an execution of the first conditional branch instruction; and
   determining whether to continue an execution of instructions of the group of instructions based on the change of instruction address.

17. The method according to claim 3, further comprising:
   providing an indication that the change in instruction address was a result of an execution of the first conditional branch instruction; and
   determining whether to continue an execution of instructions of the group of instructions based on the change of instruction address.

18. The computer program product of claim 10, wherein the instructions further comprise instructions for determining, based on the indication, whether to continue to execute instructions of the group of instructions.

19. The computer program product of claim 10, wherein the instructions further comprise instructions for:
   providing an indication that the change in instruction address was a result of an execution of the first conditional branch instruction; and
   determining whether to continue an execution of instructions of the group of instructions based on the change of instruction address.

20. The method according to claim 2, further comprising:
   providing an indication that the change in instruction address was a result of an execution of the first conditional branch instruction; and
   determining whether the processor branched based on the change of the program counter values.

* * * * *